US008589871B2

(12) United States Patent
Kelly

(10) Patent No.: US 8,589,871 B2
(45) Date of Patent: Nov. 19, 2013

(54) METADATA PLUG-IN APPLICATION PROGRAMMING INTERFACE

(75) Inventor: Todd Kelly, Groton, MA (US)

(73) Assignee: Avid Technology, Inc., Burlington, MA (US)

( * ) Notice: Subject to any disclaimer, the term of this patent is extended or adjusted under 35 U.S.C. 154(b) by 975 days.

(21) Appl. No.: 12/642,418

(22) Filed: Dec. 18, 2009

(65) Prior Publication Data

US 2011/0154290 A1 Jun. 23, 2011

(51) Int. Cl.
G06F 9/44 (2006.01)

(52) U.S. Cl.
USPC .......................................................... 717/110

(58) Field of Classification Search
USPC .................................................. 717/110–118
See application file for complete search history.

(56) References Cited

U.S. PATENT DOCUMENTS

| 6,167,404 | A | 12/2000 | Morcos et al. |
|---|---|---|---|
| 6,336,093 | B2 | 1/2002 | Fasciano |
| 6,426,778 | B1 | 7/2002 | Valdez, Jr. |
| 6,728,682 | B2 | 4/2004 | Fasciano |
| 7,512,885 | B2 | 3/2009 | Walsh et al. |
| 7,555,557 | B2 | 6/2009 | Bradley et al. |
| 7,562,099 | B1 | 7/2009 | Walsh et al. |
| 2002/0108115 | A1* | 8/2002 | Palmer ............................ 725/50 |
| 2003/0018609 | A1 | 1/2003 | Phillips et al. |
| 2004/0268224 | A1 | 12/2004 | Balkus et al. |
| 2005/0235198 | A1 | 10/2005 | Howard et al. |
| 2007/0260968 | A1 | 11/2007 | Howard et al. |

OTHER PUBLICATIONS

Kallioja, "Media Asset Management Approach to Metadata in Television Production", 2006, Master Thesis, Helsinki University of Technology, Department of Automation and Systems Technology, Finland, 153 pages.*
"Proposed SMPTE Engineering Guideline for Television—Material Exchange Format (MXF)—MXF Descriptive Metadata", 2004, The Society of Motion Picture and television Engineers, 28 pages.*
U.S. Appl. No. 09/539,749, filed Mar. 31, 2000, Balkus et al.
Avid Advanced Effects Guide, Chapter 5, Working with Plug-In Effect, Avid Technololgy, Inc., Sep. 2009, pp. 151-164.
Avid Metasync Setup and User's Guide, Avid Technology, Inc. 2004, pp. 1-92.

* cited by examiner

*Primary Examiner* — Ted T Vo
(74) *Attorney, Agent, or Firm* — Oliver Strimpel

(57) ABSTRACT

Computer-based methods and systems for editing a time-based media program involve receiving an instruction to associate metadata with a selected portion of the program, determining a type of the metadata, wherein the type of the metadata is one of a predetermined set of metadata types, identifying a software component available to the editing system that is configured to process metadata of the determined type, and associating the metadata with the selected portion of the program by executing the identified software component to process the metadata. Metadata is represented using a scheme that is shared among the various computational components that manipulate the metadata; the scheme may also be shared with a host media processing system, as well as with other systems that are used in a time-based media editing and production workflow.

21 Claims, 4 Drawing Sheets

METADATA PLUG-IN APPLICATION PROGRAMMING INTERFACE

BACKGROUND

The complexity of modern media production requires a large assortment of metadata, which is used to define a growing variety of new data. For this reason, the use of metadata associated with time-based media, such as audio and video, is gaining in importance in media production. Current video and audio editing systems provide editors with some customized means of importing data to be used for specific, predetermined purposes in conjunction with time-based media. For example, data may be used to synchronize a process with time-based media. Alternatively the data within the files is attached to the time-based media, and is retained in its imported form with the media at various stages of a production workflow. In other systems, imported data directly manipulates source audio and video, often irreversibly changing the source media, and losing the original imported data in the process.

Video and audio productions are becoming more complex, involving larger teams in the production process, often at locations remote from each other. In addition, the proliferation of output platforms, from fixed entertainment systems to wireless mobile devices increases the number of renditions from a given set of source content. These trends increase the need for metadata that can describe nontraditional functions throughout the editing workflow.

SUMMARY

Embodiments of the invention provide methods and systems for editing a time-based media program in conjunction with metadata. A metadata plug-in architecture enables metadata to be associated with time-based media in a flexible manner, permitting sharing among various computational components within an editing system, as well as between various systems and devices at various stages in a media editing and production workflow, as well as during playback of the media.

In general, in one aspect, the invention features a computer-based editing system for editing a time-based media program that involves receiving an instruction to associate metadata with a selected portion of the program, determining a type of the metadata, wherein the type of the metadata is one of a predetermined set of metadata types, identifying a software component available to the editing system that is configured to process metadata of the determined type and associating the metadata with the selected portion of the program by executing the identified software component to process the metadata.

Some embodiments include one or more of the following features. Processing of the metadata involves an interaction of the metadata with at least part of the time-based media included within the selected portion of the program. A plurality of software components, including the first mentioned software component are available to the editing system, and the type of the metadata is represented using a convention that is shared among the plurality of software components. The computer-based editing system includes a media processing engine, and the determined type of the metadata is represented using a convention that is shared between identified software component and the media processing engine. Execution of the identified software component causes the identified software component to import the metadata from a memory location that is shared with the computer-based editing system. The imported metadata is dependent on a time at which the metadata is imported and/or dependent on a spatial location of the computer-based editing system at a time at which the metadata is imported. Execution of the identified software component causes the computer-based editing system to import the metadata from a source external to the computer-based editing system, wherein the imported metadata is dependent on a time at which the metadata is imported and/or a spatial location of the computer-based editing system at a time at which the metadata is imported. Execution of the identified software component causes the identified software component to generate output metadata having an output metadata type, the output metadata type being one of the predetermined set of metadata types. The output metadata type is the same as the type of the first-mentioned metadata or is different from the type of the first-mentioned metadata. The output metadata includes information for use by a system external to the computer-based editing system. The computer-based editing system displays a timeline to represent a state of the program of time-based media, the timeline including at least one track for time-based media, and receiving the instruction to associate metadata with a selected portion of the program causes the editing system to create a metadata track on the timeline, the metadata track being characterized by the determined type of the metadata and display a representation of the metadata on a portion of the metadata track corresponding to the selected portion of the program. The method also involves receiving a second instruction to associate a second set of metadata with a second selected portion of the program, determining a type of the second set of metadata, wherein the type of the second set of metadata is one of the predetermined set of metadata types, and if the determined type of the second set of metadata is the same as the type of the first-mentioned metadata, executing the identified software component to process the second set of metadata and displaying a representation of the second set of metadata on a portion of the metadata track corresponding to the second selected portion of the program.

In another aspect, a system for editing a time-based media program includes a processor, a memory storing computer program instructions that, when processed by the processor instruct the processor to receive an instruction to associate metadata with a selected portion of the program, determine a type of the metadata, wherein the type of the metadata is one of a predetermined set of metadata types, identify a software component available to the editing system that is configured to process metadata of the determined type, and associate the metadata with the selected portion of the program by executing the identified software component to process the metadata. In some embodiments, the system processes of the metadata involves an interaction of the metadata with at least part of the time-based media included within the selected portion of the program.

In a further aspect, a computer program product comprises a computer-readable medium that includes computer program instructions stored on the computer-readable medium that, when proceeded by a computer, instruct the computer to perform a method for editing a time-based media program, the method involving the following actions: receiving an instruction to associate metadata with a selected portion of the program; determining a type of the metadata, wherein the type of the metadata is one of a predetermined set of metadata types; identifying a software component available to the editing system that is configured to process metadata of the determined type; and associating the metadata with the selected portion of the program by executing the identified software component to process the metadata. In some embodiments, the computer program product processes the metadata in a manner that involves an interaction of the metadata with at least part of the time-based media included within the selected portion of the program.

DETAILED DESCRIPTION

Figure 1:
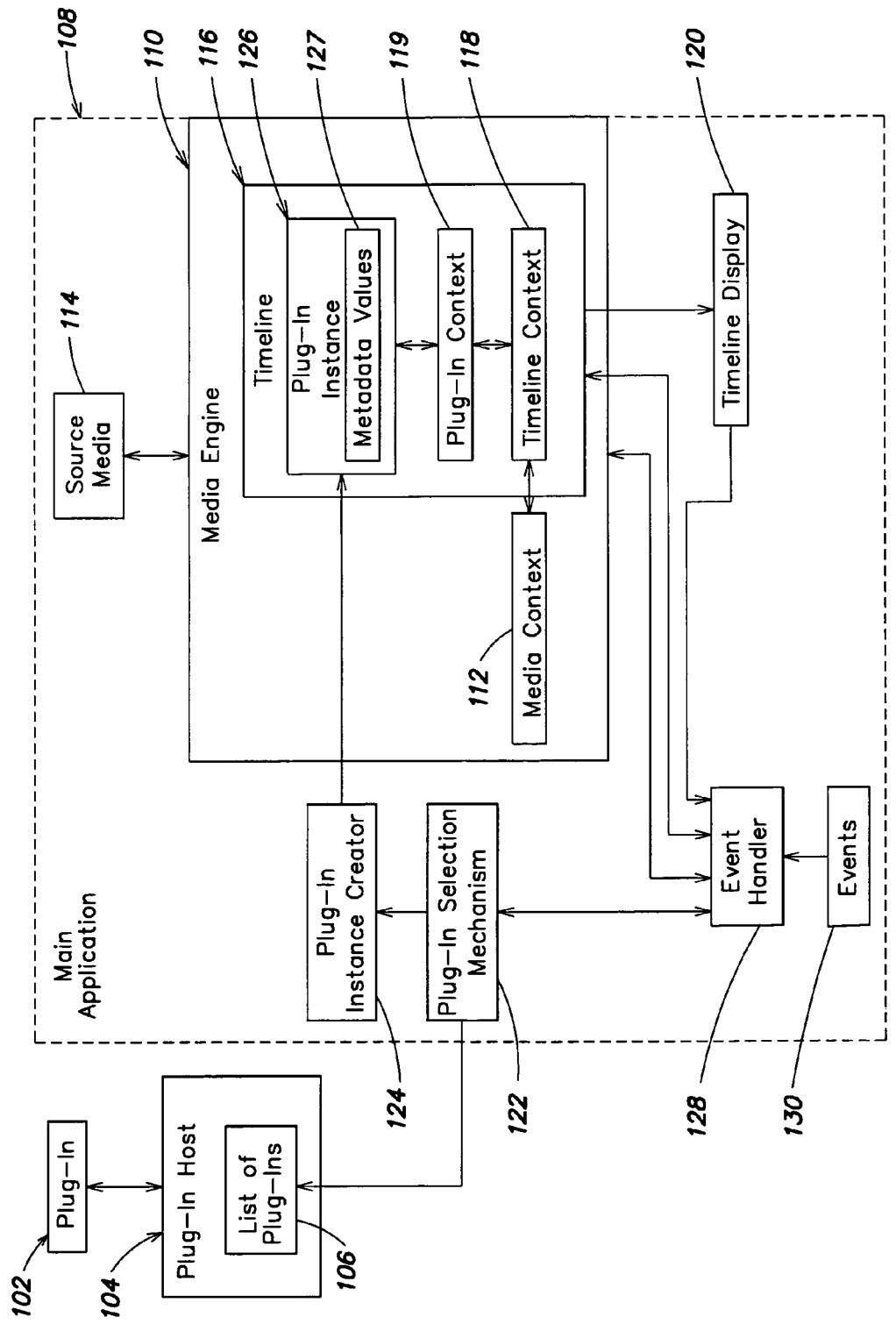
FIG. 1 is high level block diagram illustrating the architecture of metadata plug-in architecture.

Time-based media provides the primary data defining the content and the sequencing of a multimedia composition. In addition to the time-based media, content creators add ever-increasing quantities and types of metadata to their compositions. In order to maximize the usefulness of the metadata, it is necessary to associate the metadata with the time-based media so that a media processing system can synchronize the metadata to the appropriate portions of the multimedia compositions. In addition to simply being associated with a specific portion of a multimedia composition, metadata can be imported or exported, generated, manipulated, and shared across various computational components of the media processor and across additional stages in a multimedia workflow. The plug-in architecture for metadata described herein makes this possible.

Key concepts involved in a plug-in architecture for metadata include: typing of metadata; publishing of the metadata types; isolation of metadata into memory locations that can be accessed by the media processing engine and computational components interfaced to it; dynamic updating of metadata; and the ability of computational components to read and write metadata. We describe these concepts in more detail below. As used herein, the term "computational component" is equivalent to "plug-in."

In the metadata plug-in architecture, all metadata is characterized by a method of description that exposes the metadata to other computational components of the system as well as to the media processing engine. The method of description serves both to label metadata as a specific type, and also to provide a specification for that type of metadata. We describe several different methods of description, including methods that involve the use of a unique tag, a numerical key, and text. Examples of metadata types include, but are not limited to descriptions of: closed captions text; color correction lookup tables; camera data; digital rights management information; global positioning system data; licensing data; copyright clearance data; audio data; external event data; database information; production information; and title graphics.

Each computational component that acts upon metadata is characterized by the type of metadata it acts upon. Some metadata plug-ins support more than one data type. In some instances, in addition to, or instead of acting upon existing metadata, a metadata plug in outputs metadata that it generates during execution. The type of the metadata that is output may be the same or different from the type of the existing metadata acted upon. As in the case of the metadata itself, the type of data acted upon by a computational component is exposed to the media processing engine, as well as to other computational components.

A metadata plug-in reads, writes, and manipulates metadata in accord with the metadata type and specification. Use of type designations for metadata and metadata plug-ins enables components to share, read, and write the metadata in a meaningful way, as discussed in more detail below. It is not necessary for the media authoring system to be aware of all the types used by plug-ins. Furthermore, a plug-in does not need to be aware of types used by other plug-ins with which it does not share data. However, the host does have to understand the layout of the data as defined by the specification in order to pass through metadata for later use in a workflow. For example, a plug-in may create metadata that is used at the beginning and end of a production, but is not necessary for the middle steps. Such a situation arises in the case of metadata captured by a camera that is only required for archiving the final composition, and not for editing or rendering. If, on the other hand, the hosting application does understand a type, it has the potential to extend its functionality and adjust its operations by processing metadata of that type.

We now describe two schemes for specifying a metadata type, including tagging with a unique key, using a numerical tag, and using a textual description, such as XML.

In the first scheme, a metadata type is defined by one or more key, length, and value pairs. For example, an instance of metadata having a "closed caption" type is described by:

1, 6, hello!

Where "1" is a reference to a unique number that explicitly identifies the "closed caption" type. The number "6" specifies the length of the closed caption data that follows. The 'hello' specifies the actual metadata value that is of a length of 6 and a type of 1. The metadata would be the text hello!. Additional key, length, value triplets would follow until all metadata in the closed caption set are described.

In a second metadata description scheme, a metadata type is defined by using a markup language, such as XML. For example, XML that defines the "closed caption" metadata type is a follows:

```
<closed captions>
<effect properties>
    <text color> white <text color> ( a track level property... white text )
    <current caption = english> "hello world" </current caption>
    <current caption = french> "bonjour mond" </current caption>
        <text color> red <text color> ( a particular caption .... Red text )
        <text size> 10pt<text size>
        <screen position>
            <x>100 </x>
            <y> 100</y>
        </screen position>
    </current caption>
</effect properties>
</closed captions>.
```

Metadata plug-ins reading the XML data look for the first tag to determine the type of metadata being described. If the metadata plug-in understands the XML tags, it is said to understand the type of the metadata, and is able to process it.

Other metadata description schemes include those in which a metadata type is defined by prior publication of its data layout structure using a computer programming language, such as C. A developer creating a metadata plug-in uses the published specification as the accepted convention.

In traditional media editing systems, plug-in architectures, such as video and audio plug-ins, do not share metadata. These systems keep the data regarding their operations private from the rest of the system. Traditional plug-ins perform the processing on the associated media using the plug-in's internal, private metadata in a manner that shields the metadata processing from the other portions of the system. For example, a traditional audio effect plug-in may change the volume of its associated audio media sample at some point in time. The amount the volume is raised by the audio plug-in, and the fact that the audio plug-in adjusts volume, is only known to the plug-in. The media processing engine directs the plug-in to perform operations on the audio sample with no knowledge as to what that operations the plug-in performs. The media processing engine also may not know what data the plug-in will use to process the audio sample. The media processing engine passes an audio sample from the audio media, to the audio plug-in and the plug-in adjusts the audio sample data to be a higher volume. The audio plug-in then returns the louder sample to the media processing engine for sequencing.

In contrast, under the metadata plug-in architecture described herein, metadata is stored and accessed in a way that is decoupled from the precise manner in which that metadata is handled by a media processing engine. The metadata plug-in architecture described here facilitates metadata type sharing by publishing the data type description, which, in effect, becomes a shared convention. Published semantics enables media processing engines and metadata plug-ins to interpret metadata, extend it, manipulate it, or convert it into other forms.

The data representation is organized according to the type specification, which acts as a shared convention. In some systems, the description of type may be extended by other plug-ins, especially if the metadata specification uses a flexible representation, such as a markup language. Sharing a convention, or metadata definition framework, permits developers to extend each other's computational components, or to create new components that can recognize and process data types defined by others. The convention ensures interoperability of different metadata plug-ins that process a given metadata type, and may also provide a metadata definition convention across different media authoring applications, such as a media archiving application as described above.

Various computational components share metadata and can interoperate with each other without the requirement of sharing a common application program interface (API). All that is required is that the components agree on how metadata is to be represented. In the case where different metadata representation schemes are used, a translation mechanism can be used to convert metadata from one format to another, though in such a situation the host application needs to have both incoming and outgoing representations.

In the above audio plug-in example, using the described metadata plug-in architecture, the metadata plug-in describes its metadata type as "volume adjustment" within the media processing engine frame work. "Volume adjustment" metadata contains metadata that includes a value describing the amount of a volume adjustment. Using an XML type specification, the data description appears as:

```
<volume adjustment>
<amount>10db</amount>
<direction> up</direction>
<processed> no< /processed >
</volume adjustment>
```

Regardless of whether the audio metadata plug-in itself contains a component that performs the volume adjustment on the audio sample data, the metadata description of the volume adjustment is shared through the metadata plug-in architecture with other plug-ins and the media processing engine. If the media processing engine understands "<volume adjustment>" metadata, it has the option of coordinating, delaying and combining other operations when processing the audio sample. It may also process the audio sample directly using its inherent capability, or by directing such processing to a component that it knows has such capability.

The metadata plug-in architecture permits metadata to be retrieved from sources outside the media processing engine based upon actions performed by a metadata plug-in. Plug-ins that operate upon time-varying data retrieve data dynamically from sources, such as a database, which provide data that changes over time. The metadata may define a type that specifies a data source such as a web address. When the metadata is processed by a processing component, that component would use the data source to retrieve the most up to date data. In this situation, the metadata describes the source of additional data to the processing unit. In the alternative, the metadata plug-in, when writing the current metadata values, could access external data sources via an inter-process communication and then reduce the data obtained from the external data source to elements defined within the metadata type.

Application of the plug-in metadata architecture facilitates the integration of metadata from all stages of the multimedia composition workflow, including media acquisition, editing, and post-production. In the acquisition phase, devices such as cameras incorporate software that creates time based metadata using plug-ins. Such metadata includes, but it not limited to, location data, camera settings, light measurements, and production notes. Additional kinds of metadata become useful when media is acquired by a multifunction device that can both capture and edit content. An example of such a device is a cell phone.

In the post-editing phase of production systems use metadata to organize, describe, and control other events and services. Plug-ins provide a mechanism through which metadata can travel through the digital workflow in unison with associated media. In addition the plug-in mechanism allows a host application the opportunity to update metadata dynamically so that dynamic data represents a current state. This is useful when the plug-in is gathering data from a dynamic data source, outside the system such as a website or external device.

In one application, at the acquisition stage, a camera includes plug-in components that create or manipulate metadata that describes spatial and temporal attributes of the captured media, including coordinates received from a global positioning system receiver synchronized to the camera. A metadata plug-in capable of interfacing with this data, running in conjunction with the camera's media processing engine creates typed data that describes the GPS location. The data is packaged in a format consistent with the specification that describes that metadata type. When this data is read into a video editing system, a global positioning system metadata plug-in is automatically selected and associated with the incoming metadata. At this stage a metadata plug-in translates or further refines the acquired data. After output from a video editor system, another application processes the global positioning position data to synchronize the playback of the video with a map illustration of the location in which the video was shot.

In a video editing system multiple instances of the same metadata plug-in process metadata at various stages of the editorial workflow. For example, several metadata closed caption plug-ins may be used to create closed captions for playback in a video editor. Different plug-ins, using the same data type, may add additional metadata to the metadata stream associated with the editorial video composition. For example, a given portion of text can be accessed by several different language translation plug-ins. Each plug-in is responsible for a particular language translation. The combination produces selectable output from a given source text in one of a number of different languages. In this manner, each plug-in extends the metadata by translating existing metadata into a new language.

In another example of multi-stage workflow and usage of metadata, a digital newsroom uses video editing system that supports a metadata plug-in architecture. The example illustrates the use of metadata plug-in architecture to coordinate external processes and devices in a complex production environment. In the example, a video is edited in preparation for a later broadcast by the newsroom and subsequently scheduled, prepared, and queued for broadcast.

Currently, multiple software and hardware systems work in conjunction to perform the scheduling, preparation, and editing of the video sequence for a broadcast. One specific event is the scheduling of title graphics prior to broadcast. A video must first be edited, then sent to a title creation device and finally scheduled into a broadcast. Often the scheduling may dictate the amount of time available for titling and editorial. For this reason it is important to know what is happening at each stage of the production or the broadcast. The use of metadata plug-ins throughout the system permits the metadata to be used in the scheduling of events required to produce the broadcast.

By reading the metadata generated from the editorial application's metadata plug-in, the scheduler can determine when title graphics are needed. This determination can be made while an editor is still working on the video and producing events that generate metadata in the plug-in. One editorial action that produces an event is a title graphics request. The metadata plug-in schedules this request by sending scheduling information to the scheduler when the event is processed. It also produces metadata that is used later on in the workflow to describe the required titles for the titler. At this point, the scheduler queues the associated media to an on-air graphics titler based on the communication from the metadata plug-in. The edited video, which now contains the title metadata, then reaches completion of the editorial phase of the workflow. Upon the processing of a finishing event, a metadata plug-in in the editor alerts the scheduler as to the availability of the finished video sequence. The scheduler then sends the video sequence to the titler. The titler, also known as an on-air graphics system, reads the existing media and metadata. Using the metadata plug-in architecture, the metadata contains a description of the titles to be created. By implementing the metadata architecture, the titler reads the metadata, executing a component that understands the metadata stream in order to render out the title graphics to the associated video media. The titler then uses the metadata plug-in to update the state of the rendered graphics. This triggers an event in a metadata plug-in that updates the scheduler. The updated state of this metadata stream is then read by the scheduler's metadata plug-in upon the occurrence of the titler's finishing event. By re-reading the metadata plug-in data stream the scheduler is discovers when the titler is finished and therefore when the title graphics has been added to the sequence. The scheduler then schedules the video for broadcast.

In a further example, a live sound concert system synchronizes sound and video for playback. The system implements a metadata architecture that uses metadata plug-ins to read the metadata from existing edited video being screened during the concert. The video is associated with a metadata plug-in. The plug-ins communicate with additional systems either by carrying the metadata stream into a hosting application that reads the metadata and hosts the plug-ins or, through a common communication mechanism, such as a network protocol, to update its own metadata. The latter case occurs when a media processing engine triggers an update event within the plug-in. In the live sound example the live sound console receives update events from the metadata plug-in hosting application that plays back the video that is to be synchronized with the sound console. The metadata type creates parameters used to feed metadata in the form of control data to the live sound processing console directly. The live sound processing console adjusts playback based upon the metadata stream contained within the media sequence.

We now describe a plug-in metadata architecture in the context of a media processing engine in which a multimedia composition is represented by a timeline having parallel tracks for time-based media with additional tracks for representing metadata and the application of metadata plug-ins to the composition. An example of such a media processing engine is Media Composer, available from Avid Technology, Inc.

FIG. 1 is a block diagram illustrating the high level architecture of the described metadata plug-in architecture. Individual plug-in 102 is a self-contained computational unit that communicates with plug-in host 104 that generates and maintains a comprehensive list of plug-ins 106 that are available for use by the system. The plug-in host provides a mechanism for discovering and enumerating the available plug-ins. The host may also provide services for loading the plug-ins into memory and unloading the plug-ins from memory. Main application 108 includes media engine 110 that incorporates media context 112, which provides information related to the environment in which media is processed and played back by the system such as sample rate, resolution, start point, end point and media format information. Media engine 110 has read/write access to media 114, which includes the source video and audio for the time-based composition. The media engine organizes and plays back media 114 according to media context 112, which describes the playback requirements and may handle media output including media display. Media engine 110 performs the core functions of a time-based media editor. For a video editor, such functions include organizing media context 112, loading media 114 from disk to memory, coordinating timeline 116 through timeline context 118 to synchronize the playback of appropriate media 114 in a manner consistent with the requirements of media context 112 based on changes to the state of the system from event handler 128. The current state of media 114 in memory is encapsulated in media context 112, and is stored in timeline 116, a data structure used to represent the current state of the media to the user that includes one or more time-based media tracks (video, audio), and one or more metadata tracks. The timeline also includes timeline context 118, which is in communication with media context 112 and which maintains the timeline in a state that is an accurate representation of the current state of the composition. Timeline display 120 presents a visual representation of timeline data structure 116 to the user in a manner with which the user can interact. Interactions by a user create events 130 which change system data, and which are encapsulated by event handler 128.

When selection of a plug-in occurs, either as a result of user action or of system execution of a command, an event is generated and added to one of pending events 130. Such an event invokes plug-in selection mechanism 122, which is in communication with list of plug-ins 106. The plug-in selection mechanism can instruct plug-in instance creator 124 to generate plug-in instance 126 and plug-in context 119. Plug-in context 119 serves to provide plug-in instance 126 with the contextual information relevant to the plug-in based on time-line context 118 and media context 112. Plug-in instance 126 communicates with time-line context 118 through plug-in context 119, to create metadata values 127. The sequence of operations within the main application is controlled by event handler 128, which is in communication with media engine 110, timeline 116, plug-in selection mechanism 122 and timeline display 120.

Figure 2:
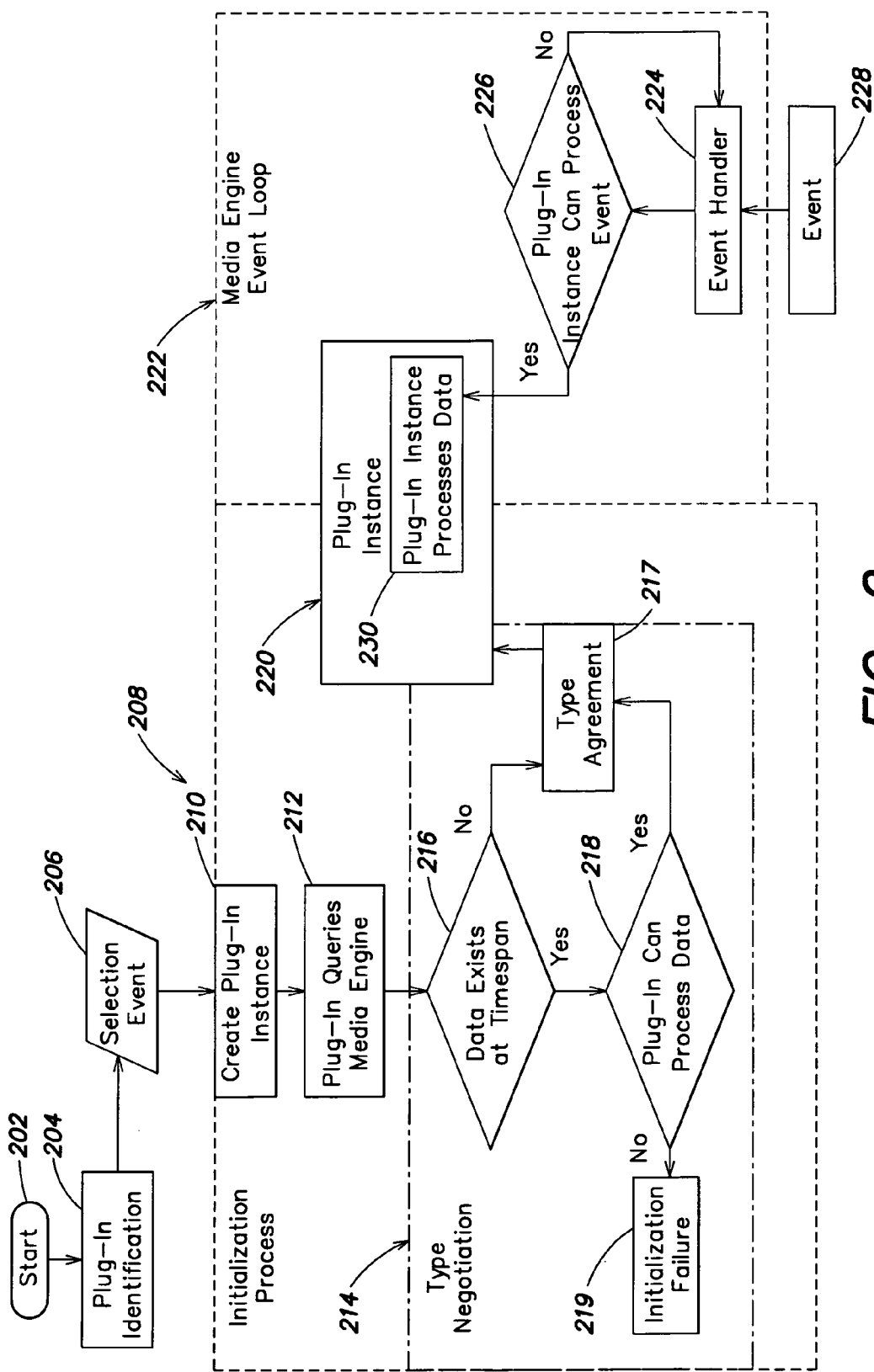
FIG. 2 is a flow chart illustrating execution in a system implementing a metadata plug-in architecture.

Referring to FIG. 2, we now describe the flow of control in a system that implements a plug-in metadata architecture. System start 202 occurs at the relevant point when an application is ready to examine available metadata components. The application begins with plug-in identification 204 where the system identifies the available metadata plug-in components. Upon the occurrence of selection event 206, one or more of the plug-ins identified as a result of plug-in identification step 204 are selected, based upon criteria included in selection event 206. Once a plug-in meeting the criteria for selection is identified, plug-in initialization process 208 begins. A plug-in instance is created in step 210 in the system memory. The plug-in instance interface queries the media engine (step 212) for relevant contextual information regarding type negotiation 214. The first step of the type negotiation is to query whether metadata exists within the relevant time span (step 216) by querying the media and timeline contexts for metadata relevant to the plug-in's context over the time span for which the metadata plug-in is being initialized. If data does not exist, the type agreement 217 will be reached by having the plug-in instance 220 define the type. If there is metadata that exists at the time-span for which the plug-in is being initialized, there is an additional query of the plug-in to determine if the plug-in is capable of understanding and processing the existing data (step 218), i.e., whether the type of the existing data is compatible with the plug-in. If the plug-in cannot process the existing metadata the initialization fails (step 219). The failure to identify compatible types may mean that the plug-in memory is released and the process may return to some relevant point in the process such as start 202 or selection event 206. If the plug-in can process the existing type, the data description is agreed upon and type agreement 217 will be reached allowing plug-in initialization process 208 to complete. The result is an initialized plug-in instance 220 that operates on an agreed upon type of data.

The plug-in instance is inserted into media engine event loop 222, which is where the normal event processing takes place for the media engine. The events handled include the normal playback of media, responses to user events, processing traditional plug-in and processing metadata plug-ins.

The metadata plug-in instance is added to event handler 224, which is responsible for dispatching event 228 to the appropriate part of media engine event loop 222. The occurrence of a change in the system such as a user event or clock update also may result in the generation of an event that is dispatched by the event handler. The event dispatched from event handler 224 to metadata plug-in instance 220 results in plug-in instance 220 being queried to determine if it can process the event (step 226). If the plug-in instance cannot process the dispatched event, control is returned to event handler 224. The event handler may then attempt to process the event by using another event handler in the system. If the event handler dispatches an event to plug-in instance 220, and the plug-in instance is able to process the event, (i.e., step 226 generates a "yes"), the plug-in instance is called upon to read, write, create and manipulate the instance data (230) in accord with the type agreement (217) arrived at during the type negotiation process (214). Flow control then returns to event handler 224 for the processing of the next event.

Figure 3:
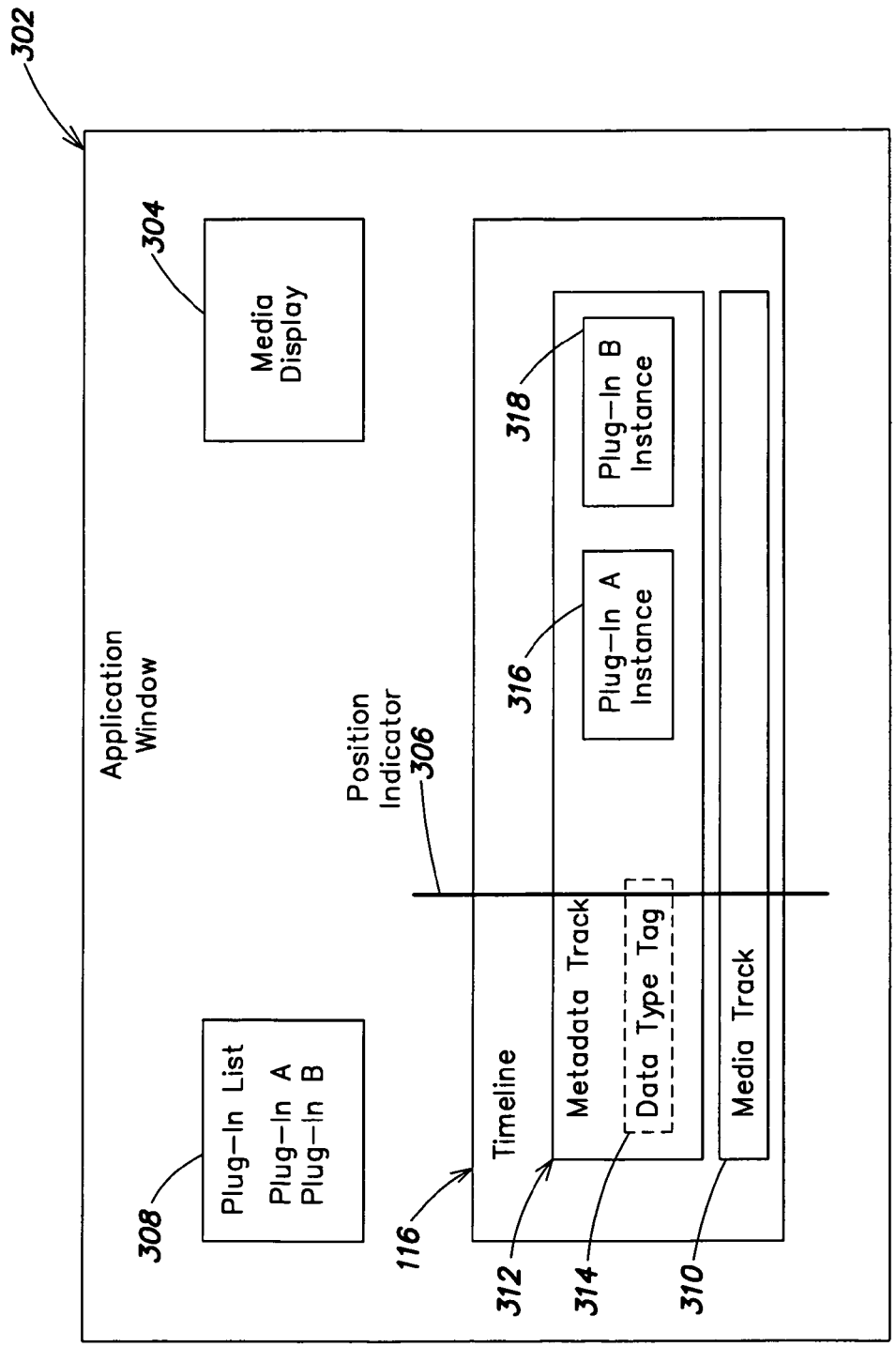
FIG. 3 is a high level illustration of a user interface for implementing a metadata plug-in architecture.

A user interface for implementing the described plug-in metadata architecture is illustrated in FIG. 3. Application window 302 displays timeline 116, media display 304 of the media at the position indicated by position indicator (scrubber bar) 306, and a list of available plug-ins 308 generated from plug-in host component 106 (FIG. 1). Timeline 116 is generated by timeline display component 120 (FIG. 1), and includes at least one media track 310 and at least one metadata track 312. Associated with metadata track 312 is an indication of the data type 314 that characterizes the track, as well as the time-spans over which instances of the various metadata plug-ins are applied, such as plug-in A instance 316 and plug-in B instance 318. The interface permits users to drag and drop metadata plug-ins from list 308 onto a metadata track on the timeline in a manner similar to the application of a video or audio effect to a composition. The user can create new metadata tracks and manually assign a metadata type to it, or create an untyped ("null" type) track, which becomes typed automatically upon subsequent association with metadata or a plug-in.

Figure 4:
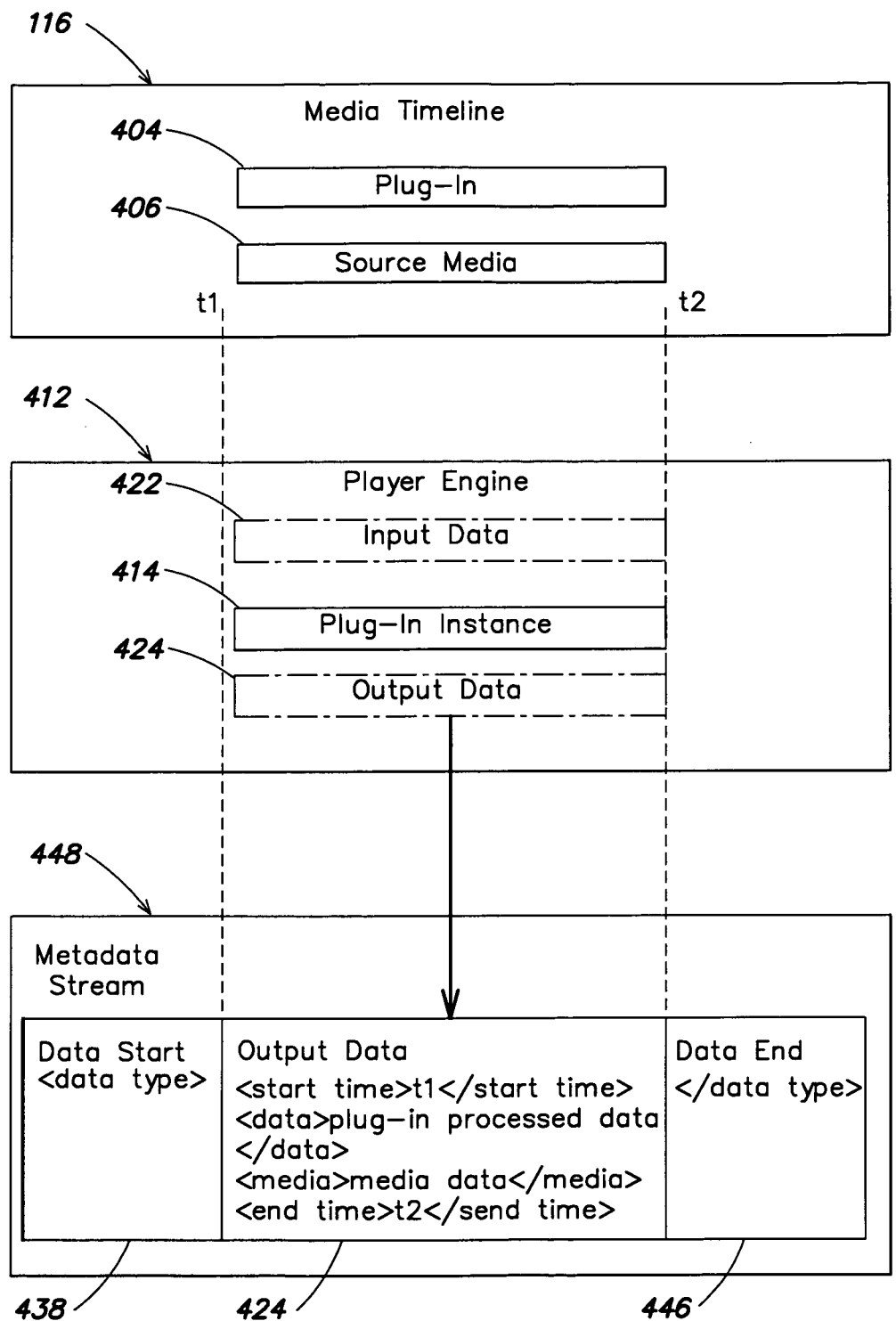
FIG. 4 is a diagram illustrating the data stream in a system implementing a metadata plug-in architecture.

FIG. 4 illustrates the data stream of the described metadata plug-in architecture. Timeline 116 displays a metadata plug-in instance 404 and source media 406. Player engine 412, which is a component of media engine 110, synchronizes the play back of source media 406 and the metadata associated with plug-in 404 in accordance with the timeline. In order to accomplish this, the player engine organizes the data and the context of that data in conjunction with other components such as the user interface and hardware display for multimedia playback. For plug-in 404, which extends over a specified time span, an instance of the plug-in is generated (414) by the player engine that contains within memory a representation of the plug-in and its associated data.

For playback and execution of plug-in 404 from time t1 to time t2 on the timeline, player engine 412 gathers any input data 422 that may be required by plug-in instance 414. Input data 422 contains information that is descriptive of one or more of source media 406, timeline 304, and the state of player engine 412. Input data 422 is passed to plug-in instance 414, which processes the data passed to it and generates output data 424 upon execution. In the described embodiment, output data 424 is in markup language format, as illustrated in metadata stream 448. Thus, the output that results from applying plug-in 404 to source media 406 between time t1 and t2 on the timeline is metadata stream 448. The output stream includes data start 438, comprising markup language that defines the agreed upon data type for plug-in 404. Data start 438 is the type resulting from negotiation between the player engine 412 and plug-in 404 when an event (corresponding to selection event 206, FIG. 2), first placed plug-in 404 on timeline 304 to create plug-in instance 414, as discussed above in connection with FIG. 2. Similarly, data end 446 is a markup language tag that defines the end of the negotiated data type across the timeline segment.

Multiple metadata plug-ins can be applied to the same, or to partially overlapping portions of the timeline. The initialization process, type checking and negotiation is performed for all the applied plug-ins. Many plug-ins having different types can be associated with a timeline. In the described embodiment, a separate metadata track is generated for each type of metadata plug-in. Multiple metadata tracks characterized by the same type may also be created and displayed.

In addition to implementations in various video processing products such as cameras, projectors, recorders, playback devices and the like, the various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. In a computer-based editing system for editing a time-based media program, a method comprising:

the editing system receiving an instruction to associate metadata with a selected portion of the program, the selected portion being indicated by at least a position in time in the time-based media program, the metadata conforming to a metadata specification and having a type;

the editing system determining a type of the metadata, wherein the type of the metadata is one of a predetermined set of metadata types;

the editing system identifying a software component from among a plurality of software components available to the editing system, wherein the identified software component is configured to process metadata of the determined type, wherein the editing system and the plurality of software components read and write metadata conforming to the metadata specification; and the editing system associating the metadata with the selected portion of the program by providing the metadata and context information of the editing system to the identified software component, executing the identified software component to process the metadata according to the context information, and receiving data from the identified computation component resulting from such processing.

2. The method of claim 1, wherein processing of the metadata involves an interaction of the metadata with at least part of the time-based media included within the selected portion of the program.

3. The method of claim 1, wherein a plurality of software components, including the first mentioned software component are available to the editing system, and
wherein the type of the metadata is represented using a convention that is shared among the plurality of software components.

4. The method of claim 1, wherein the computer-based editing system includes a media processing engine, and the determined type of the metadata is represented using a convention that is shared between identified software component and the media processing engine.

5. The method of claim 1, wherein execution of the identified software component causes the identified software component to import the metadata from a memory location that is shared with the computer-based editing system.

6. The method of claim 5, wherein the imported metadata is dependent on a time at which the metadata is imported.

7. The method of claim 5, wherein the imported metadata is dependent on a spatial location of the computer-based editing system at a time at which the metadata is imported.

8. The method of claim 1, wherein execution of the identified software component causes the computer-based editing system to import the metadata from a source external to the computer-based editing system.

9. The method of claim 8, wherein the imported metadata is dependent on a time at which the metadata is imported.

10. The method of claim 8, wherein the imported metadata is dependent on a spatial location of the computer-based editing system at a time at which the metadata is imported.

11. The method of claim 1, wherein execution of the identified software component causes the identified software component to generate output metadata having an output metadata type, the output metadata type being one of the predetermined set of metadata types.

12. The method of claim 11, wherein the output metadata type is the same as the type of the first-mentioned metadata.

13. The method of claim 11, wherein the output metadata type is different from the type of the first-mentioned metadata.

14. The method of claim 11, wherein the output metadata includes information for use by a system external to the computer-based editing system.

15. The method of claim 1, wherein the computer-based editing system displays a timeline to represent a state of the program of time-based media, the timeline including at least one track for time-based media, and wherein receiving the instruction to associate metadata with a selected portion of the program causes the editing system to:
create a metadata track on the timeline, the metadata track being characterized by the determined type of the metadata; and
display a representation of the metadata on a portion of the metadata track corresponding to the selected portion of the program.

16. The method of claim 15, further comprising:
receiving a second instruction to associate a second set of metadata with a second selected portion of the program;
determining a type of the second set of metadata, wherein the type of the second set of metadata is one of the predetermined set of metadata types; and
if the determined type of the second set of metadata is the same as the type of the first-mentioned metadata, executing the identified software component to process the second set of metadata and displaying a representation of the second set of metadata on a portion of the metadata track corresponding to the second selected portion of the program.

17. A system for editing a time-based media program, the system comprising:
a processor;
a memory storing computer program instructions that, when processed by the processor instruct the processor to:
receive, through the editing system, an instruction to associate metadata with a selected portion of the program, the selected portion being indicated by at least a position in time in the time-based media program, the metadata conforming to a metadata specification and having a type;
identify a plurality of software components available to the editing system, wherein the editing system and the plurality of software components read and write metadata conforming to the metadata specification;
determine a type of the metadata, wherein the type of the metadata is one of a predetermined set of metadata types;
identify a software component from among a plurality of software components available to the editing system, wherein the identified software component is configured to process metadata of the determined type; and
associate the metadata with the selected portion of the program by providing the metadata and context information of the editing system to the identified software component, executing the identified software component to process the metadata according to the context information, and receiving data from the identified computation component resulting from such processing.

18. The system of claim 17, wherein processing of the metadata involves an interaction of the metadata with at least part of the time-based media included within the selected portion of the program.

19. A computer program product comprising:
a computer-readable medium;
computer program instructions stored on the computer-readable medium that, when proceeded by a computer, instruct the computer to perform a method for editing a time-based media program, the method comprising:
the editing system receiving an instruction to associate metadata with a selected portion of the program, the selected portion being indicated by at least a position in time in the time-based media program, the metadata conforming to a metadata specification and having a type;
the editing system determining a type of the metadata, wherein the type of the metadata is one of a predetermined set of metadata types;
the editing system identifying a software component from among a plurality of software components available to the editing system, wherein the identified software component is configured to process metadata of the determined type, wherein editing system and the plurality of software components read and write metadata conforming to the metadata specification; and
the editing system associating the metadata with the selected portion of the program by providing the metadata and context information of the editing system to the identified software component, executing the identified software component to process the metadata according to the context information, and receiving data from the identified computation component resulting from such processing.

20. The computer program product of claim 19, wherein processing of the metadata involves an interaction of the metadata with at least part of the time-based media included within the selected portion of the program.

21. A computer system for editing a program, the program comprising time-based media, the computer system comprising:
a processor;
a memory storing computer program instructions that, when processed by the processor configure the computer system to implement:
a host program having a graphical user interface presenting one or more timelines representing audio and video data, and one or more timelines representing metadata, wherein through the graphical user interface the host program receives instructions to associate metadata with selected portions of the program, the selected portions being indicated by a position one or more of the timelines representing metadata, wherein metadata is in a format defined by a metadata specification and has a type;
a plurality of computational components, each computational component being configured to process metadata conforming to the metadata specification, the computational component further being configured to process metadata of a particular type;
wherein the host program determines the metadata types for which computational components are available on the computer system; and
wherein the host program, in response to metadata conforming to the metadata specification being associated with a selected portion of the program:
determines a type of the metadata;
identifies one of the plurality of computational components available to process metadata of the determined type;
initializes the identified computational component to process the metadata;
provides the metadata and context information of the host program to the identified computational component; and receives data from the identified computational component resulting from the identified computational component processing the metadata according to the context information.

* * * * *